United States Patent [19]

Lunde et al.

[11] Patent Number: 4,984,488

[45] Date of Patent: Jan. 15, 1991

[54] METHOD OF SECURING CUTTING ELEMENTS ON CUTTING TOOL BLADE

[75] Inventors: Gerald D. Lunde; Harold H. Harvey, Jr., both of Bossier City, La.

[73] Assignee: Tri-State Oil Tools, Inc., Bossier City, La.

[21] Appl. No.: 512,973

[22] Filed: Apr. 23, 1990

Related U.S. Application Data

[60] Division of Ser. No. 181,812, Apr. 15, 1988, which is a continuation-in-part of Ser. No. 816,287, Jan. 6, 1986, Pat. No. 4,796,709.

[51] Int. Cl.$^5$ ............................................. B21K 5/12
[52] U.S. Cl. ..................................... 76/115; 76/108.2; 166/55.6; 228/185
[58] Field of Search ................ 76/101.1, 108.1, 108.2, 76/108.4, 108.6, DIG. 11, DIG. 12, 115; 166/55.6, 55.7, 55.8; 408/144, 145, 213, 227, 229; 175/374, 375, 325; 144/205; 407/2, 6, 32, 66, 100, 116, 118, 119; 409/143; 228/122, 185

[56] References Cited

U.S. PATENT DOCUMENTS

| | | | |
|---|---|---|---|
| 1,844,351 | 2/1932 | Falkenstein | 76/DIG. 11 X |
| 1,909,975 | 5/1933 | Mackey et al. | 76/115 X |
| 1,949,050 | 2/1934 | Howard et al. | 76/108.2 |
| 2,084,441 | 6/1937 | Howard et al. | 76/108.1 |
| 3,145,790 | 8/1964 | Bridwell et al. | 175/409 |
| 4,688,652 | 8/1987 | Crist | 76/108.2 X |
| 4,710,074 | 12/1987 | Springer | 175/325 X |
| 4,712,626 | 12/1987 | Shaw | 76/108.2 X |

*Primary Examiner*—Z. R. Bilinsky
*Attorney, Agent, or Firm*—Dodge Bush & Moseley

[57] ABSTRACT

A cutting tool (10) for removing members downhole from a well bore and adapted to be inserted within a well from the upper end (12) of the casing (14). The cutting tool (10) includes a plurality of elongate blades (32) on the cylindrical body (18) of the cutting tool (10). Cutting elements (42) of a predetermined size and shape are arranged in a symmetrical predetermined pattern on each blade (32) in side-by-side relation in a plurality of predetermined tranversely extending rows and a plurality of predetermined generally vertically extending columns. The cutting elements (42) in adjacent transverse rows for each blade (32) are staggered and have different concentric cutting paths. The cutting elements (42E) in corresponding transverse rows on adjacent blades (32A, 32B) are staggered and have different concentric cutting paths. The blades (32A, 32B) of the embodiment of FIGS. 7-13 have a separate recess (50) on the leading face (34A) for each individual cutting element (42E) for precisely positioning the cutting element (42E). Each cutting element (42E) has a groove (42K) for receiving and directing forwardly the extending end of a metal shaving (S) to facilitate breaking thereof from the casing (14).

3 Claims, 8 Drawing Sheets

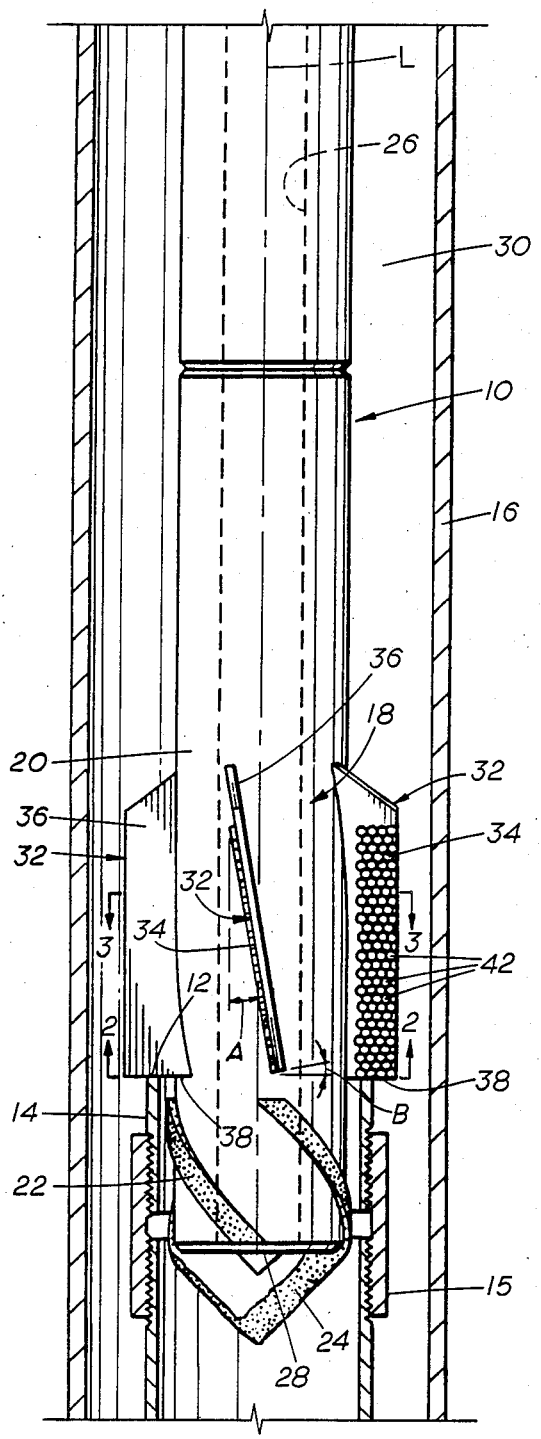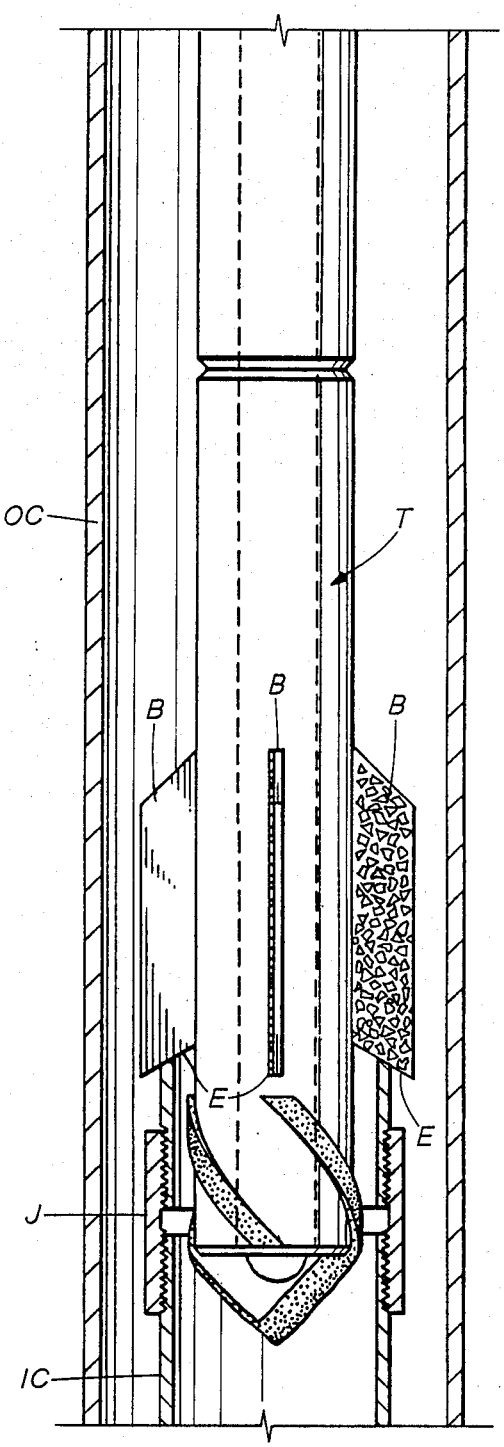
FIG.1
FIG.1A
(PRIOR ART)

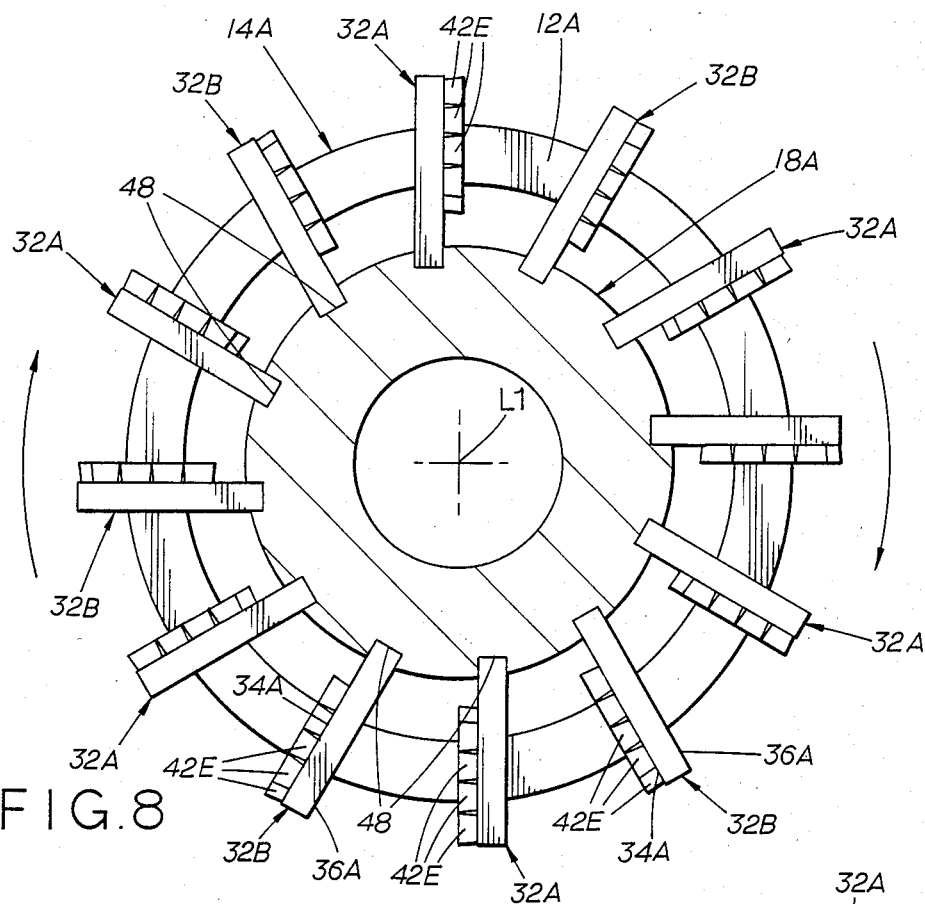
FIG.8
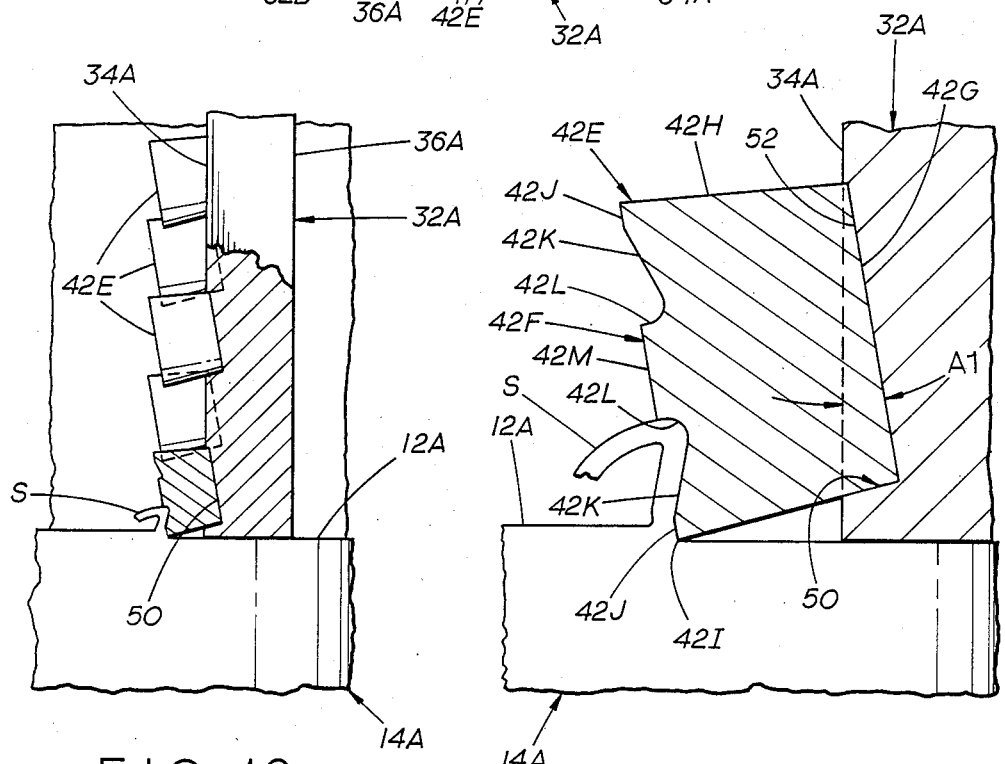
FIG.10
FIG.11

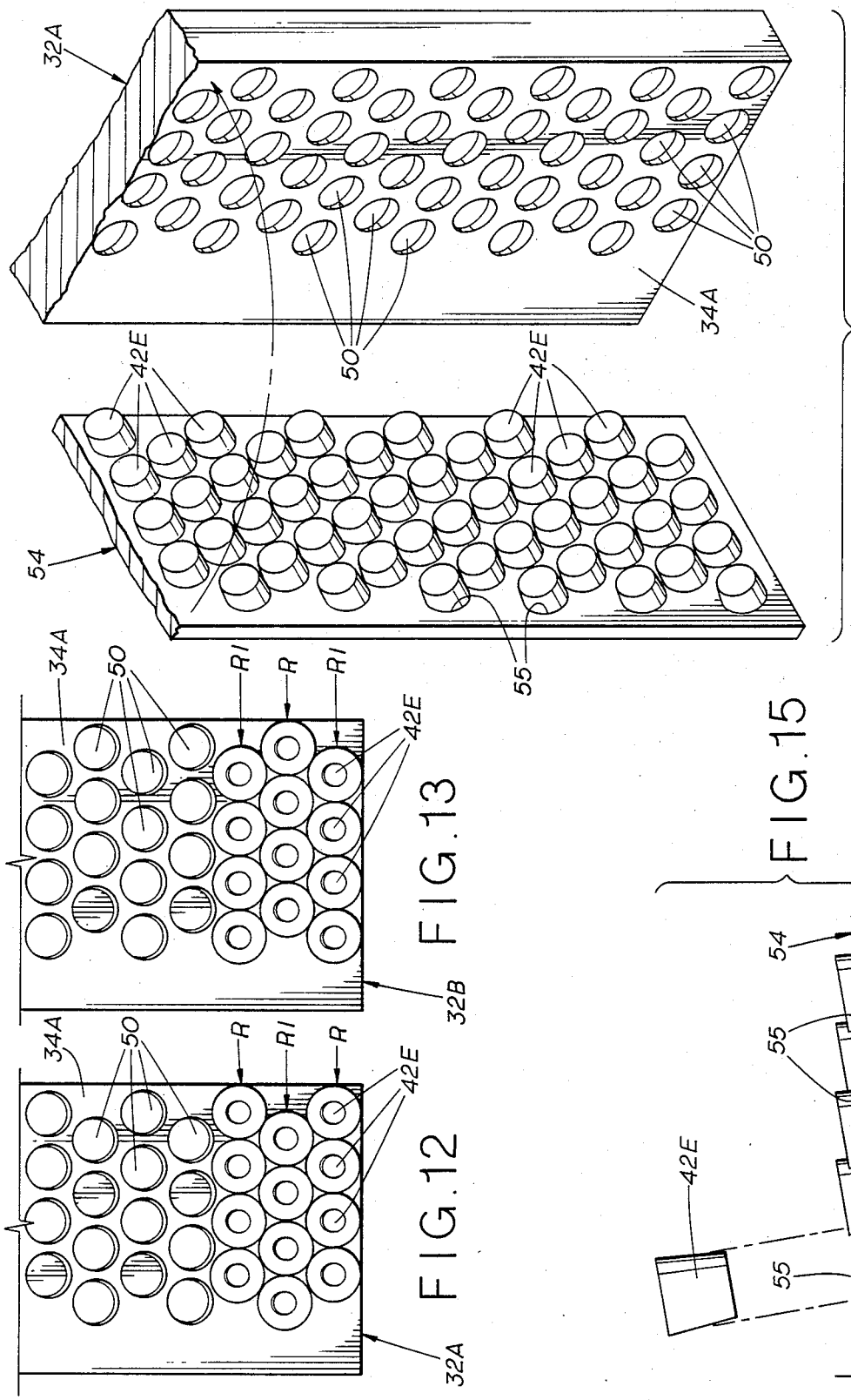

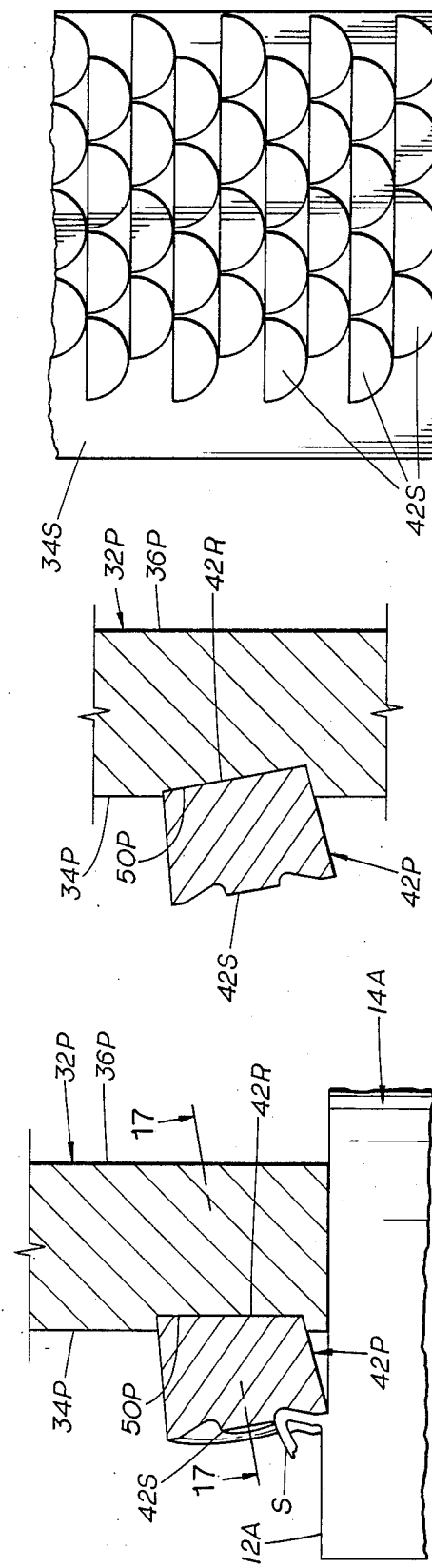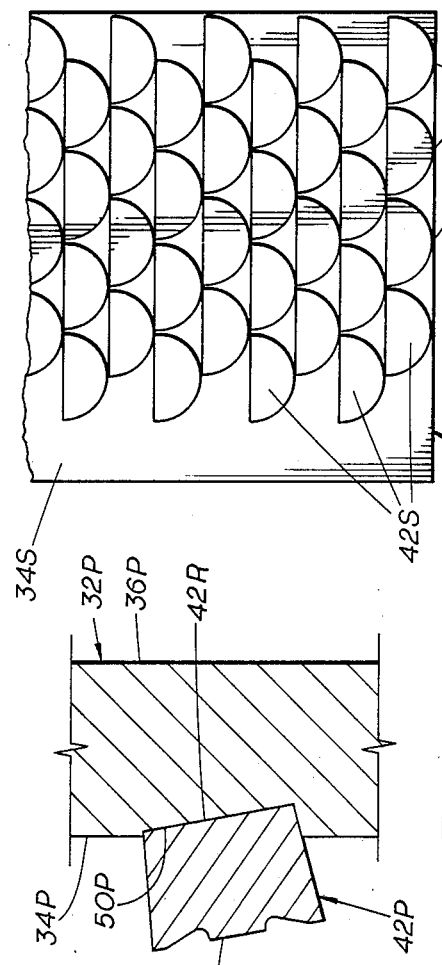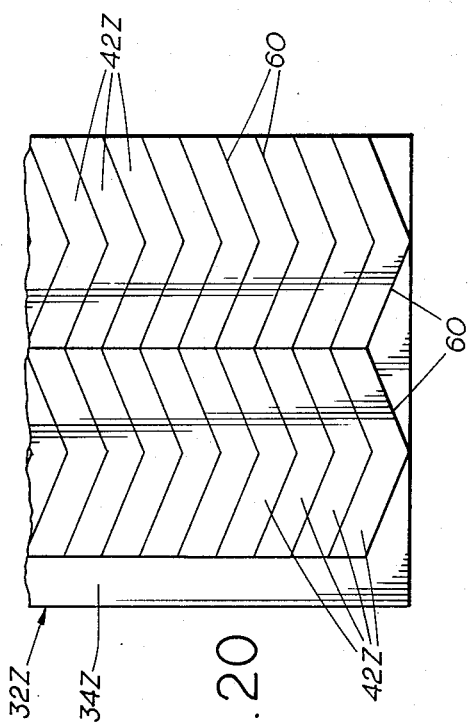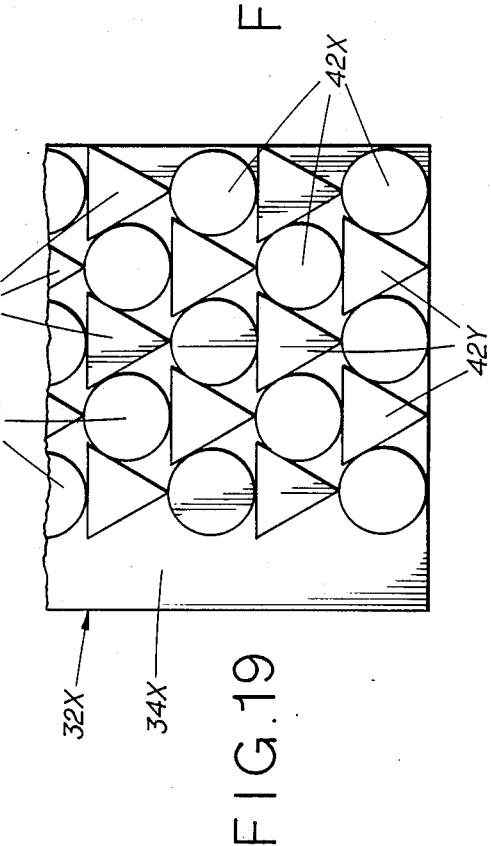

METHOD OF SECURING CUTTING ELEMENTS ON CUTTING TOOL BLADE

CROSS REFERENCE TO A RELATED APPLICATION

This application is a divisional of pending application Ser. No. 181,812, filed Apr. 15, 1988, which is a continuation-in-part of application Ser. No. 816,287 filed Jan. 6, 1986, now U.S. Pat. No. 4,796,709 dated Jan. 10, 1989.

BACKGROUND OF THE INVENTION

This invention relates generally to a cutting tool for removing materials downhole from a well bore, such as pipe, casing, casing liners, tubing, jammed tools or the like, and more particularly, to such a cutting tool which is inserted within a well for removing predetermined members by first reducing the members to turnings or small chips for removal from the well.

Heretofore, various types of milling or cutting tools have been provided for cutting or milling existing pipe or casing previously installed in a well. Such tools normally have cutting blades on their lower ends and are lowered within the well or casing to be cut and then rotated in a cutting operation. A suitable drilling fluid is normally pumped down a central bore of the cutting tool for discharge beneath the cutting blades and an upward flow of the discharged fluid in the annulus outside the cutting tool removes the cuttings or chips resulting from the cutting operation from the well.

Milling tools for removing a section of existing casing or the like from a well bore have been provided heretofore. Sections of casings are removed for various purposes, such as, for example, to permit a side tracking operation in directional drilling, to provide a perforated production zone at a desired level, to provide cement bonding between a small diameter casing and the adjacent formation, or to remove a loose joint of surface pipe. Also, milling tools are used for milling or reaming collapsed casing, for removing burrs or other imperfections from windows in the casing system, for placing whipstocks in directional drilling, or for aiding in correcting dented or mashed-in areas of casing or the like.

A common milling tool has a plurality of blades spaced about the outer surface of the tool with the lower surfaces of the blades engaging the upper circular end surface of the pipe or casing in a cutting operation to chip or cut away progressively the end of the casing. Each blade takes a bite or cut from the upper end of the casing during rotation of the milling tool. The rate of penetration or cutting away of the casing is normally dependent on several factors, such as, for example, the rotational speed of the tool, the amount of weight on the tool, the number and type of blades, and the rate at which the chips or cuttings are removed from the well. Normal penetration rates heretofore have been around eight (8) to eleven (11) feet per hour and tools have required replacement after removal of around fifty feet or less of casing. Also, long turnings over six inches in length that tend to curl and internest with each other have been provided heretofore and in some instances the turnings have been several feet in length.

A critical factor in obtaining a high rate of penetration is in the removal of the metal scrap material and oftentimes the limiting factor to the cutting operation is the rate of removal of the metal scrap material. Long turnings or shavings tend to restrict, at times, such removal rates by internesting.

SUMMARY OF THE PRESENT INVENTION

This invention is directed to a cutting tool adapted to be lowered downhole within a well for removal of materials from the well by cutting, milling, grinding or chipping of the material into turnings or small chips which are subsequently removed from the well. The cutting tool may comprise pilot mills, section mills, pipe cutters, junk mills, starting mills, reamers, tapered mills, casing mills, rotary shoes, or other similar cutting tools in which tungsten carbide chips embedded in a matrix material are presently used.

The embodiment of the invention illustrated is particularly directed to a cutting tool adapted to be lowered within an outer well casing for cutting, grinding, or chipping a section or length of an existing casing previously installed in the well. As used in the specification and claims herein, the term "casing" shall be interpreted to include pipe, casing, tubing, liners, and other similar tubular members installed within a well.

The embodiment of the cutting tool illustrated comprises a plurality of improved cutting blades closely spaced from each other about the outer periphery of a generally cylindrical tool body. Each blade is generally identical in appearance and has a plurality of staggered cutting elements thereon which have leading faces preferably inclined rearwardly with respect to the axis of rotation to define a negative axial rake and a cutting surface in cutting contact with and biting into the upper circular end of the casing to be removed. The inclination of the leading faces of the cutting elements results in a dragging or pulling of the lower cutting surface across the upper annular end surface of the casing being cut away to provide an improved smooth cutting action which also results in the formation of relatively short length turnings or chips having a length generally less than two inches thereby to permit the easy removal of the scrap metal from the well by drilling fluid.

The leading surface of each blade is defined by a plurality of cutting elements of a predetermined shape and size arranged in a predetermined pattern on a leading surface of the blade with respect to the axis of rotation. In one embodiment a plurality of generally cylindrical metal carbide discs shown in FIGS. 1-6, are arranged in adjacent generally horizontal rows on the blade, each row having at least two carbide discs therein and being staggered with respect to adjacent rows. The hard carbide discs are secured, such as by brazing, to the base or body of the blade and form the lower cutting surface which digs or bites into the upper end of the casing to be removed. The carbide cutting elements and the supporting base of the blade wear away from the lower end of the blade as the cutting operation continues with successive rows of the discs being presented for cutting the casing. The blade is preferably formed of a mild steel material substantially softer than the metal carbide discs so that any drag from the wear flat formed by the blade body contacting the upper end of the casing is minimized.

The lower cutting surface of the blade has a so-called negative axial rake angle formed by the rearward inclination of the leading faces of the cutting elements with respect to the axis of rotation and this results in a pulling or dragging of the cutting surface across the upper end of the casing to provide an improved cutting action. This cutting action when combined with the maximum number of blades that can be feasibly accommodated on the tool body permits the efficient and effective removal of the metal cuttings or turnings formed in the cutting action. A depth of cut or bite is taken by each blade of between around 0.002 inch to 0.005 inch and such a relatively large thickness of metal cutting results in a short length which restricts curling or rolling up and thereby is easy to remove from the well. It has been found that a surface speed of each blade along the uppermost end of the casing of an optimum of around three hundred to three hundred and fifty feet per minute provides the most effective cutting action with the present invention.

Insofar as the life of the blade is concerned, the blade length determines its life and with a twelve inch blade for the embodiment of FIGS. 1-6 on which the carbide discs are secured, around two hundred feet of casing may be cut before the blades require replacement. Such a long life blade minimizes the number of trips in and out of this bore hole required for replacement of the tools or blades As noted above, it has been normal heretofore to obtain a penetration rate or cutting away of the casing within the well of around eight to eleven feet per hour. However, the present invention has had rates of penetration of from thirty to forty-five feet per hour which is three to four times greater than the rate of penetration heretofore. This has been obtained by the use of the novel blades comprising the present invention. For example, when using the milling tool of the present invention to remove an inner casing having an outside diameter of 9⅝ inches with twelve blades positioned at intervals of thirty degrees (30°) about the circumference of the cylindrical tool body and operated at a surface speed of around three hundred and fifty feet per minute along the upper end surface of the casing with a bite of around 0.004 inch, a weight of around 12,000 pounds, and a torque of between 2,500 foot pounds and 3,000 foot pounds, a penetration rate of between thirty and forty feet in one hour was obtained. Such an increased rate of penetration has been unexpected and surprising as compared with the rates of penetration heretofore with somewhat similar types of milling tools as shown by the art.

Several different embodiments of this invention are illustrated. The specific embodiment shown in FIGS. 7-13 illustrates a cutting tool having straight blades secured to the cylindrical tool body along the longitudinal axis of the tool while having cutting elements thereon with leading faces having a predetermined negative axial rake with respect to the direction of rotation. Such an arrangement permits blades of an elongate generally rectangular shape to be easily secured, such as by welding, along the longitudinal axis of the tool body in a minimum of time and is particularly desirable for tool bodies having relatively small diameters, such as three inches, for example.

The cutting elements of a predetermined shape and size are preferably arranged in rows across the width of the blade and in columns along the length of the blade in a predetermined pattern. Further, the cutting elements on alternate blades are staggered horizontally with respect to the cutting elements on adjacent blades so that different cutting paths are taken by the cutting elements on adjacent blades.

In order for each individual cutting element to be loaded equally during the cutting operation with the remaining cutting elements in its row, it is desirable that each cutting element be precisely positioned on each blade in aligned horizontal relation with the other cutting elements of a similar shape and size. An indexing mark or indicator for each cutting element is provided on the blade and the respective cutting element is positioned thereon. Such an indexing mark or locator is illustrated as a recess or dimple on the leading face of the blade for receiving each cutting element in the embodiment of FIGS. 7-13. The cutting elements for a specific blade may be preassembled in the desired pattern prior to positioning on a blade by utilizing a template, for example. Then, the entire assembly of cutting elements is positioned on a face of the blade within a tolerance of around 0.010 inch relative to the recesses. The leading face of each cutting element preferably has a negative axial rake of between 2° and 20° with respect to the axis of rotation. Also, the leading face of each cutting element may be provided with a recess or groove to direct metal turnings or cuttings forwardly for breaking off a relatively small length metal chip or turning from the upper end of the casing.

It is an object of this invention to provide a cutting tool for removing materials downhole from a well bore by first reducing the materials into turnings or small chips for removal.

It is an object of the present invention to provide a cutting tool having cutting blades with cutting elements of a predetermined size and shape arranged in a predetermined pattern and adapted to be lowered downhole within a well bore for cutting or milling away a member within the well bore at a high penetration rate, such as thirty feet an hour or more.

An additional object is to provide such a cutting tool having cutting elements arranged in generally transverse rows on each blade with the cutting elements on alternate blades being staggered horizontally with respect to the cutting elements on adjacent blades thereby to provide different cutting paths for adjacent blades.

It is a further object of the present invention to provide such a cutting tool having improved blades with each blade having a plurality of cutting elements thereon with leading faces of the cutting elements having depressions therein for receiving metal turnings cut from the metal material to effect a breaking of the metal turning from the material being removed.

Another object of this invention is to provide a modified cutting tool having the blades mounted on the tool body along the longitudinal axis of the body with cutting elements arranged in a precise predetermined pattern on the blade with each cutting element precisely positioned relative to the remaining cutting elements in the pattern thereby to obtain a substantially equal loading for each cutting element during the cutting operation of the tool.

A further object is to provide such a modified cutting tool in which the cutting elements for a specific blade may be preassembled in the desired pattern prior to positioning on the blade, and then positioned on the blade at a precise marked location for each cutting element thereby to obtain substantially equal loading for the cutting elements during the cutting operation of the tool.

Other objects, features, and advantages of this invention will become more apparent after referring to the following specification and drawings.

FIG. 1A is a longitudinal section of a prior art milling tool for progressively cutting away the upper end of an inner well casing for removing a predetermined section or length of casing from the well;

FIG. 1 is a longitudinal section of one embodiment of the present milling tool comprising the present invention having the improved blades thereon arranged angularly on the tool body for cutting into the upper annular end of an inner casing installed within a well for removal of a section of the inner casing;

FIG. 8 is cross section of the cutting tool of FIG. 7 taken generally along line 8—8 of FIG. 7;

FIG. 10 is a section taken generally along line 10—10 of FIG. 9;

FIG. 11 is an enlarged fragment of FIG. 10 showing an individual cutting element cutting and directing a metal turning downwardly;

FIG. 12 is an enlarged plan of a lower end portion of a blade removed from the tool body and showing some of the cutting elements removed from recesses on the blade for precisely positioning the cutting elements;

FIG. 13 is a view similar to FIG. 12 but showing an adjacent blade with the horizontal rows of cutting elements staggered with respect to the rows of cutting elements on the blade of FIG. 12;

FIG. 14 illustrates a method for positioning cutting elements at precise locations on a blade by first preassembling all of the cutting elements for one blade into the desired pattern;

FIG. 15 is an enlarged sectional view of a portion of a template for preassembly of the cutting elements as illustrated in FIG. 14;

FIG. 16 is an enlarged section of a modified blade and cutting element in which the recess is formed with a desired angle to provide a negative axial rake for the leading cutting face of the cutting element;

FIG. 17 is a section taken generally along line 17—17 of FIG. 16 and showing the recess of FIG. 16 angled radially to provide a negative radial rake;

FIG. 18 is a plan view showing a further embodiment of cutting elements having semi-circular leading faces and mounted on a blade in horizontal staggered rows;

FIG. 19 is a plan of another embodiment of cutting elements having rows of cutting elements formed of respective triangular and circular leading faces;

FIG. 20 is a plan of a still further modification of the cutting elements having leading faces formed of a chevron or V-shape and mounted in two vertically aligned rows on a blade;

Figure 1B:
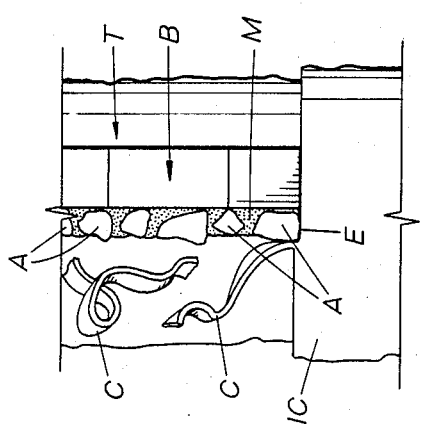
FIG. 1B is an enlarged fragment of the prior art milling tool shown in FIG. 1A showing the cutting action resulting from a prior art blade having a leading cutting face in alignment with the axis of rotation and showing a random pattern of broken inserts.

Referring now to the drawings for a better understanding of this invention, and more particularly to FIGS. 1A and 1B in which an example of a prior art milling tool T is illustrated, a plurality of blades B are spaced about the outer periphery of tool T. Blades B have lower cutting edges E for contacting and engaging in cutting relation the upper annular end of an inner casing IC installed within an outer casing OC of a well. Blades B progressively cut away a predetermined section of the inner casing including joints J between casing lengths which are normally around thirty feet.

Blades B are welded onto the outer periphery of the cylindrical body of milling tool T and extend in a vertical direction parallel to the longitudinal rotational axis of milling tool T. The front leading faces of blades B have carbide cutting chips A secured thereon in a random pattern in a matrix M to provide a cutting surface. As shown in FIG. 1B the lower cutting edge E of blade B extends at a right angle to the front face of blade B and rides along the annular end surface of inner casing IC to provide a plurality of relatively long length metal turnings or chips C in various shapes and sizes. The relatively wide variation in the sizing of the metal turnings or metal chips C may range from around 0.001 inch to 0.020 inch in thickness with a substantial amount of long length turnings over six inches as a result of the relatively rough rotary movement resulting from contact of the lower surfaces of blades B with the upper end of inner casing IC. With such a wide variation of metal chips or cuttings, particularly the long length curled or rolled up shavings, sometimes such metal shavings will intertwine or internest in a mass which will restrict the removal of the metal turnings by the drilling fluid being discharged from the lower end of milling tool T through a central bore for return through the annulus of the casing.

With the use of prior art milling tool T as shown in FIGS. 1A and 1B having around eight blades for cutting away a casing section having an OD of nine and ⅝ths inches, a rate of penetration of around eight to eleven feet per hour was normal heretofore with the blades wearing away at the rate of around two inches for each ten to fifteen feet of casing section being removed.

Referring now to FIGS. 1–6 in which one embodiment of the present invention is illustrated, a milling or cutting tool comprising the present invention is illustrated generally at 10 and is adapted for cutting or milling away the annular end 12 of inner casing 14 and associated coupling 15 which are positioned within outer casing 16 of a well. Milling tool 10 is supported from the surface for rotation by suitable power means, as well known, which is also adapted to apply a predetermined loading on tool 10.

Milling or cutting tool 10 has a cylindrical lower body portion 18 which defines an outer peripheral surface 20. The lower end portion of body portion 18 forms a stabilizer and stabilizer ribs 22 thereon are spaces slightly from the inner peripheral surface of inner casing 14 for positioning milling tool 10 accurately within inner casing 14. Tapered end 24 acts as a pilot to guide tool 10 within the upper end of casing 14.

Milling tool 10 has a central bore 26 therein which is adapted to receive drilling fluid pumped from the surface for discharge from the end of tool 10 and 28. The discharged drilling fluid removes the metal cuttings, chips, shavings, or metal scrap material resulting from the cutting operation from the annulus 30 outside milling tool 10 by flushing the scrap material to the surface for disposal. A relatively small clearance, such as around 1/16th inch, is provided between stabilizer ribs 22 of tool 10 and the inner periphery of inner casing 14 so that a minimum lateral movement of tool 10 is provided upon rotation thereof.

Figure 4:
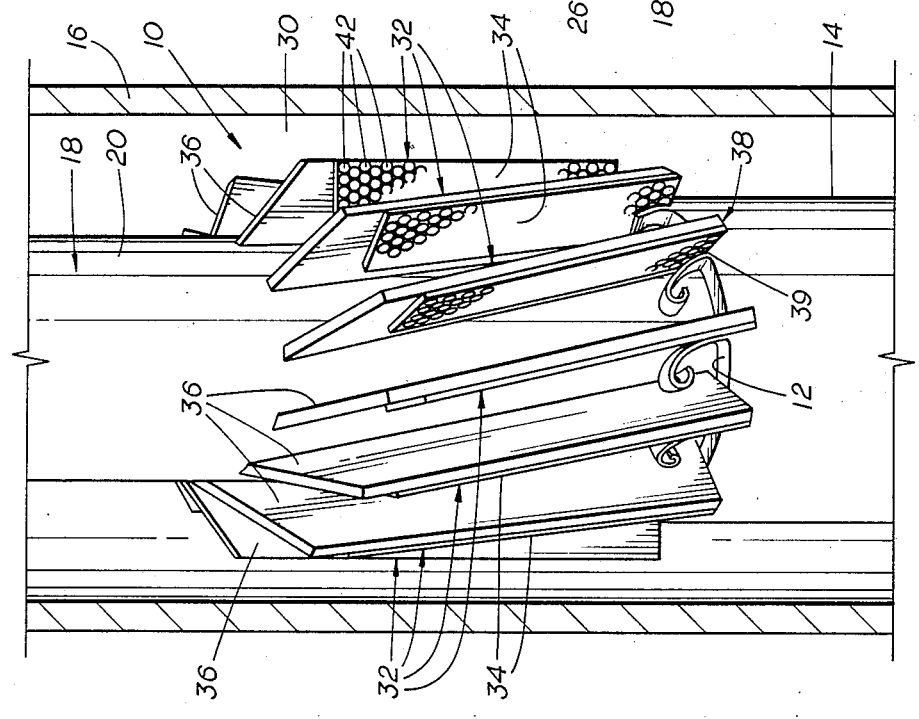
FIG. 4 is a perspective of the milling tool of FIGS. 1-3 showing the lower cutting surface of the cutting blades biting into and engaging the upper annular end of the inner casing to strip or cut away in a plurality of a generally uniform size metal cuttings a predetermined section of casing.
Figure 2:
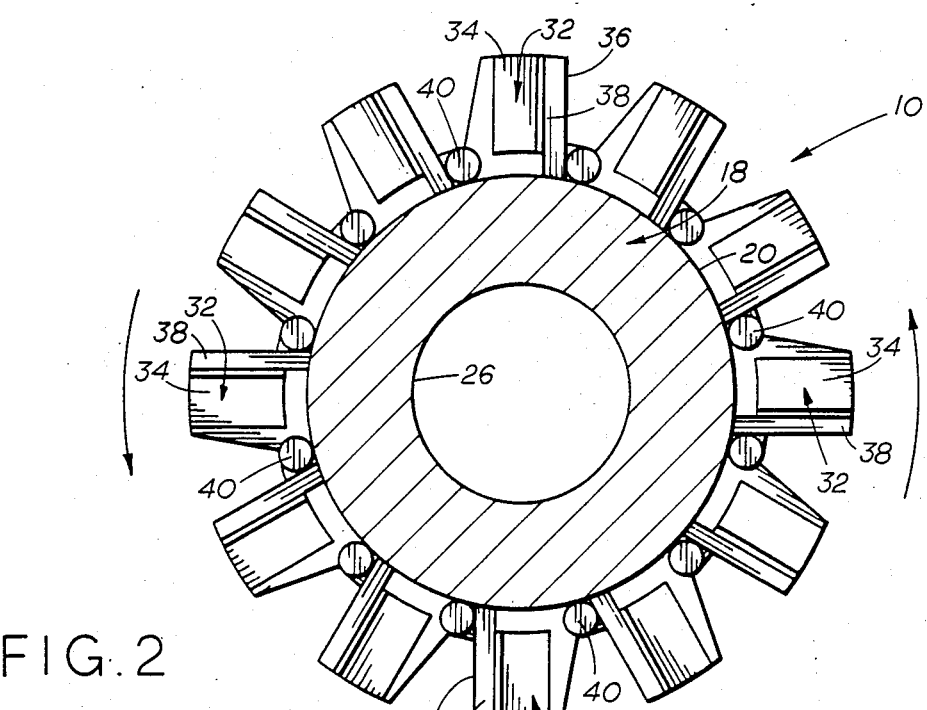
FIG. 2 is a section taken generally along the line 2—2 of FIG. 1 and showing the arrangement of the cutting blades about the cylindrical body of the milling tool shown in FIG. 1.
Figure 3:
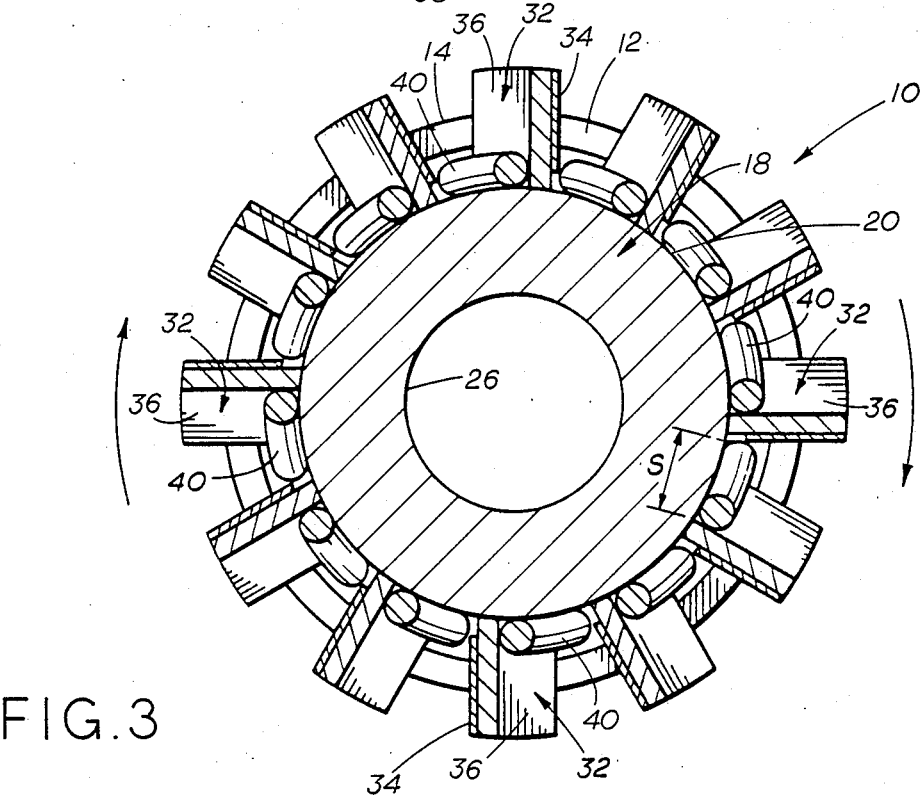
FIG. 3 is a section taken generally along line 3—3 of FIG. 1 and showing the improved cutting blades of the milling tool.
Figures 7, 9:
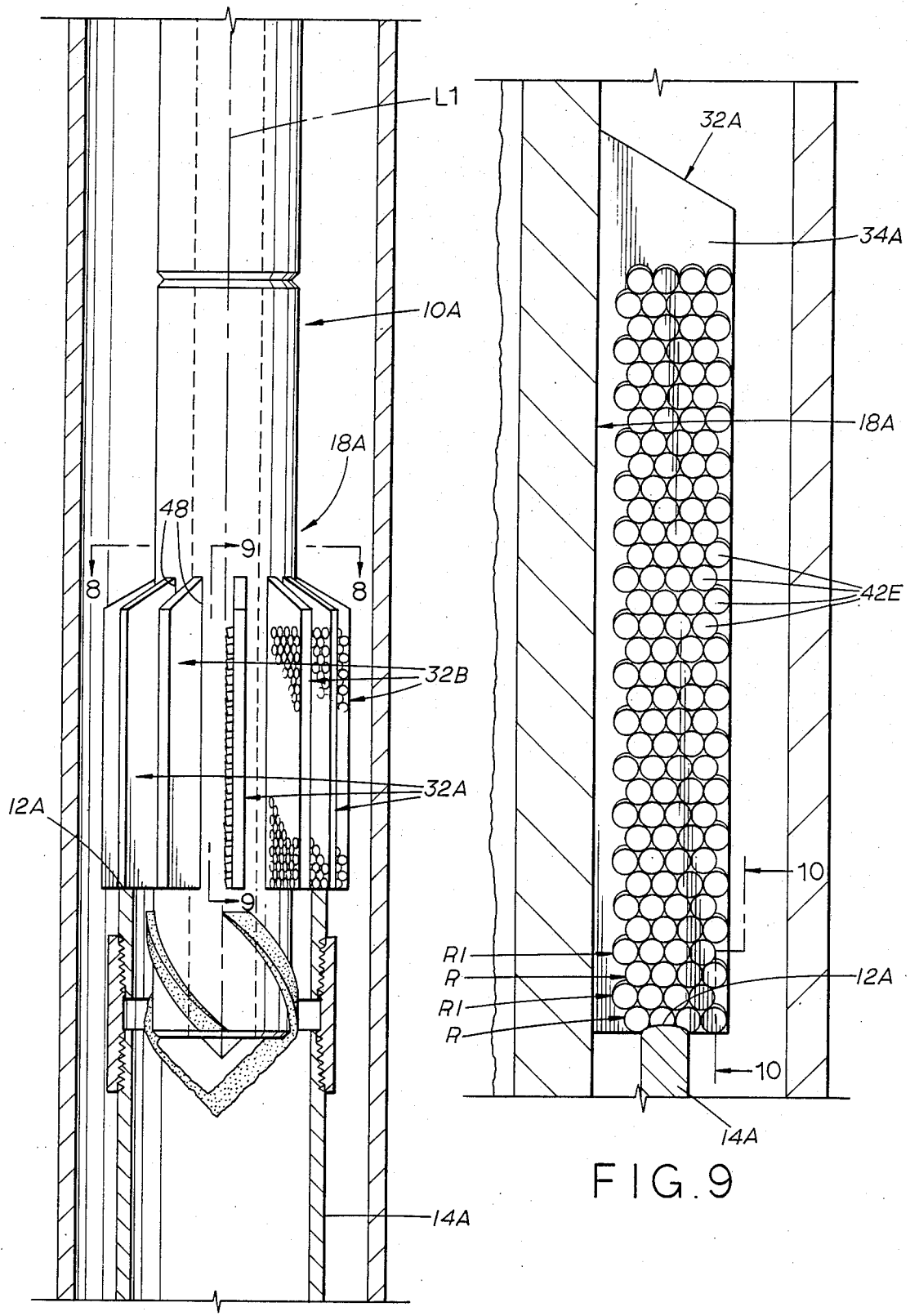
FIG. 7 is a longitudinal section of another embodiment of the invention in which the blades are arranged along the longitudinal axis of the cutting tool and each of the cutting elements thereon has a leading cutting face with a predetermined negative axial rake.
FIG. 9 is a section taken generally along line 9—9 of FIG. 7.

An important feature of the present invention is the improved blade design which is designed to provide a maximum cutting action with minimal loading and minimal frictional contact between the blades and the upper annular end 12 of inner casing 14 which is to be cut away and removed. The blade design shown in the embodiment of FIGS. 1–6 comprises a plurality of generally identical straight blades indicated at 32 and utilizing as many blades as can be feasibly positioned about outer periphery 20 of cylindrical body 18 while providing adequate spacing for an effective removal of the metal cuttings or turnings from annulus 30 by drilling fluid. A spacing S as shown in FIG. 3 between blades 32 along periphery 20 of at least around one inch is believed necessary in order to provide adequate space to remove satisfactorily the metal cuttings and scrap material, and preferably a spacing S of around two inches. Such a spacing S may be as much as around three inches under some operating conditions and provide effective results. Thus, a spacing S between blades 32 at peripheral surface 20 of between one inch and three inches provides best results. For example, for a milling tool 10 utilized for removal of casing 14 having an OD of 9⅝ inches, the use of twelve blades 32 arranged at thirty degrees (30°) to each other about surface 20 has been found to obtain best results. It is noted that FIGS. 2–4 show tool 10 with twelve blades 32 thereon, while FIG. 1, for purposes of illustration, has only three blades illustrated with the remaining blades omitted. It is to be understood, however, that tool 10 of FIG. 1 would have twelve blades 32 thereabout.

Each blade 32 has a leading planar face or surface 34, an opposed trailing planar face or surface 36, and a lower cutting and wear surface 38 positioned between and at right angles between surfaces 34 and 36 prior to use of blades 32. Lower surface 38 is in contact with and rides along the upper annular end 12 of inner casing 14 which is being cut and removed during the cutting operation. For securing blades 32 to the outer peripheral surface 20, a suitable backup or support rod indicated at 40 is positioned at the juncture of trailing surface 36 with peripheral surface 20, and welded in position as shown in FIG. 2 with the elongate blades 32 extending at an angle A shown in FIG. 1 with respect to the vertical rotational axis L of milling tool 10 and preferably providing a negative axial rake which is an optimum of five degrees (5°), for example. An optimum range for angle A is between around three degrees (3°) and fifteen degrees (15°), but it is believed that under certain conditions angle A between around two degrees (2°) and twenty degrees (20°) would function satisfactorily. Further, under certain conditions, a positive axial rake angle, or a 0° axial rake angle, would function satisfactorily.

Since each straight blade is mounted on cylindrical body 18 in an angled relation as shown in FIG. 1 with respect to the longitudinal axis L of body 18, leading face 34 has a radial rake which will vary from a maximum positive radial rake at the lower end of blade 32 to a 0° rake at the location where blade 32 intersects longitudinal axis L, and to a maximum negative radial rake at the upper end of blade 32.

Also, as a result of the angularity of each blade 32, leading face 34 is inclined or slanted rearwardly from its upper end to its lower end in respect to the axis of rotation and this provides a negative axial rake shown by angle B to the cutting edge 39 of lower surfaces 38 thereby to permit cutting edge 39 to be pulled across and along end surface 12 in cutting relation for providing a highly effective smooth cutting action. It is noted that prior to any wear of blades 32, lower surface 38 is perpendicular to leading face 34 and angle B shown in FIG. 1 is the same as angle A. However, a horizontal wear flat surface is formed after use of blades 32 as shown in FIG. 6.

Leading face 34 is defined by a plurality of hard carbide cutting elements of a predetermined size and shape arranged in a symmetrical pattern and preferably comprising a plurality of cylindrical carbide discs or buttons 42 secured by suitable brazing or the like to the planar face of base 43 of blade 32. Discs 42 are preferably arranged in a plurality of horizontal staggered rows of three and four discs as illustrated generally in FIG. 5 and in a plurality of generally vertically extending columns. A disc 42 which has been found to function in a satisfactory manner has a thickness of 3/16ths inch, a diameter of ⅝ths inch, and is sold under the name Sandvik S6 by the Sandvik Company, located in Houston, Tex. Each cylindrical disc 42 has a front face 42A which forms a portion of the surface area of leading face 34, an opposed rear face 42B flush with base 43, a front outer cutting edge 42C about front face 42A forming cutting edge 39 of lower surface 38 that bites or digs into the upper annular surface 12 of casing 14 as shown in FIG. 6 and annular surface or face 42D about disc 42 between faces 42A and 42B. Front faces 42A of discs 42 extend in a plane which defines leading face 34 and at angle A with respect to the axis of rotation thereby to provide a negative axial rake for face 42D forming cutting edge 39. Front face 42A is preferably provided with a depressed area or recess therein receiving metal turning or chip 44 to aid in breakage of the chip 44 thereby to form a chip breaker. When the cutting operation is commenced with an unused blade 32, lower surface 38 which is formed by the lowermost portion of surface 42D and the lower edge portion 47 of blade 32 is at right angles to face 23 and at an angle B as shown in FIG. 1 with respect to the annular end surface 12 of casing 14.

Figure 6:
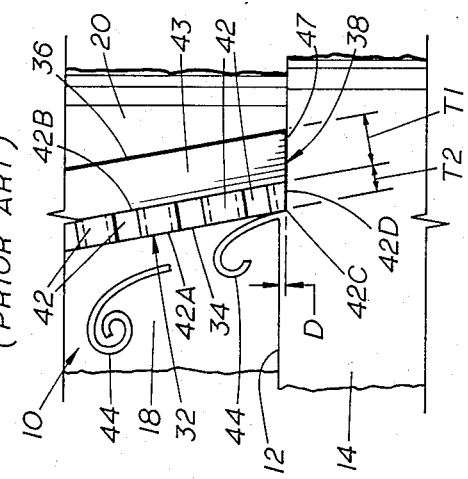
FIG. 6 is an enlarged side elevation of the blade looking generally along line 6—6 of FIG. 5 and showing the lower cutting edge of the blade engaging the upper end of the inner casing in a cutting operation.
Figure 5:
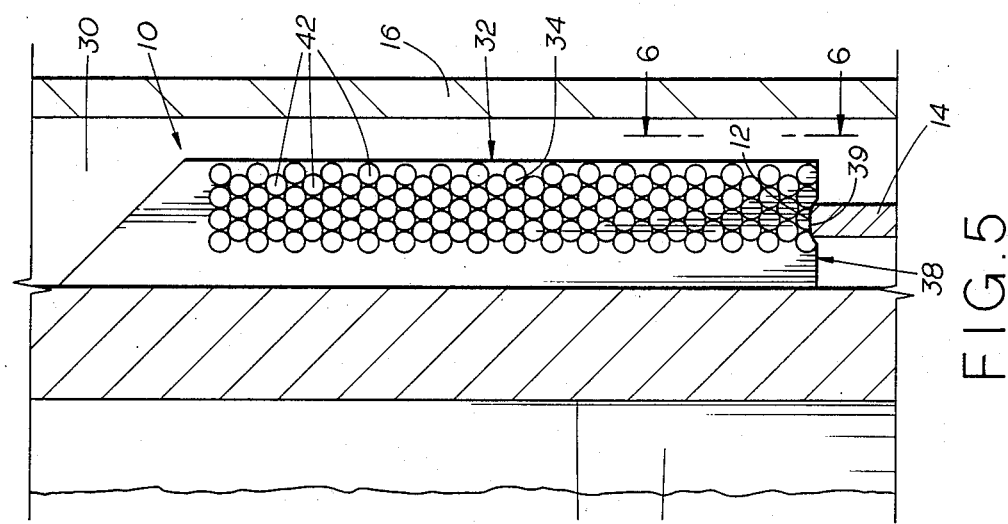
FIG. 5 is an enlarged fragment of FIG. 1 illustrating one blade with hard carbide cutting elements secured to and forming the leading face thereof.

However, after initial wear of the lowermost row of discs 42, lower surface 38 becomes a flat horizontal surface as shown in FIG. 6 formed by the horizontal wear flat surface on lower edge portion 47 of blade base 43 and the lowermost horizontal portion of surface 42D. After the initial horizontal wear flat surface 38 is formed as shown in FIG. 5 by the lowermost row of discs 42 and base 43, successive wear along the length of blades 32 is along a horizontal plane as shown in FIG. 6. Thus, the cutting surfaces formed by discs 42 are the cutting edge 42C and the portions of faces 42A and 42D immediately adjacent cutting edge 42C.

It has been found that a suitable depth of cut or bite taken from end surface 12 as shown at D in FIG. 6 is around 0.004 inch. With the depth of cut or bite taken by blade 32 of around 0.004 inch as shown in FIG. 6, and with a smooth rotational action, metal turnings 44 have been found to have a generally short length between around one and three inches. Under some conditions, it may be desirable to utilize a chip breaker such as provided by a depression in face 42C of discs 42, to aid in the breaking away of relatively short chips 44 thereby to permit easy removal of the scrap material formed by metal turnings 44 from the well by drilling fluid. As previously noted, oftentimes the limiting factor in the rate of penetration is the rate of removal of the metal scrap material and it is important to have a metal turning 44 of a short length so that it does not intermesh with other turnings to form a large mass of scrap material. By forming a turning 44 having a thickness between 0.002 inch and 0.005 inch in thickness and a length between one and three inches, at least for a substantial majority of all scrap metal material, a highly effective removal of the metal cuttings is obtained with a corresponding high rate of penetration for milling tool 10.

In order for blade 32 to provide a sufficient support for the carbide discs 42, it has been found that base 43 should have an optimum thickness T1 as indicated in FIG. 6 twice the thickness T2 of disc 42 in order to provide adequate strength and yet not exert a relatively large drag to the cutting operation. A thickness T1 between one and three times thickness T2 has been found to function satisfactorily. The thickness T1 of blade base 43 may be, for example, around ⅜ths of an inch when the thickness T2 of discs 42 is 3/16ths of an inch on a ratio of two to one. Further, in order to reduce any drag resulting from base 43 moving along end surface 12, the material from which base 43 is formed is of a mild steel having a Brinell hardness range of around 145 with an optimum Brinell hardness range of around 130 and 160. The carbide discs 42 have a Rockwell A hardness of around eighty-five to eighty-eight which is around seven to nine times harder than the material from which blade 32 is formed. For satisfactory results, it is believed that discs 32 should be at least around four times harder than base 43.

Casing 14 has a Brinell hardness of around two hundred and carbide discs 42 are around five times harder than casing 14. As a result of base 43 being formed of a material several times as soft as carbide discs 42, the wear flat surface at 47 is easily worn away with a minimum of friction thereby providing a minimum of heat and a minimum torque required for rotation of milling tool 10, as is desirable.

The depth of cut D shown in FIG. 6 is selected in order to obtain a maximum rate of penetration with a large number of blades with each blade obtaining the safe cutting depth or bite D. Further, it is desirable to obtain a relatively short metal shaving or cutting 44 which does not tend to intertwine with other shavings and provide an internesting mass which might restrict the removal of such metal scrap. The inclination of face 42A in contact with the metal turnings 44, particularly if formed with a depression therein, assists in the breaking of metal turnings 44 at a relatively short length of one and three, for example, and since a substantial thickness of shavings 44 is provided, the curling or turning up of the ends of the shavings is restricted.

The rotational speed of milling tool 10 is designed to provide a surface speed of blades 32 along the upper annular surface 12 of casing 14 at an optimum of around three hundred (300) to three hundred and fifty (350) feet per minute in order to obtain an optimum cutting depth for each blade of around 0.004 inch. When operating at such a speed, a torque of around 2500 to 3000 foot pounds has been found to be satisfactory for rotation of milling tool 10. A surface speed of between two hundred (200) and four hundred and fifty (450) feet per minute along surface 12 is believed to operate satisfactorily under certain conditions.

As previously noted, when utilizing blades 32 comprising the embodiment of the present invention as shown in FIGS. 1-6 in the manner set forth above, a penetration rate of from thirty to forty-five feet per hour has been obtained which is three or four times greater than the rate of penetration heretofore. This has been attained by the use of the novel blade design for milling tool 10 as shown and described utilizing a large number of blades 32 closely spaced between one and three inches from each other, each blade 32 taking a substantially large bit or depth of cut D between 0.002 inch and 0.005 inch from a negative rake on a hard carbide disc, and with minimal drag and friction resulting from the horizontal wear flat surface on the blades, a smooth rotation of milling tool 10 is obtained with a maximum rate of penetration. Blades 42 are worn away progressively with each row of discs 42 being successively worn away in a continuous cutting operation. For a blade around twelve inches in length, a casing section or length around two hundred (200) feet of casing, 14, for example, may be cut. The blade design of the present invention cuts away a length of casing around fifteen to twenty feet in length upon each inch of wear on blade 32.

As a specific example, for milling the end of an N-80 grade of casing 14 having a weight of forty-seven (47) pounds per foot, an OD of nine and ⅝ths inches, and utilizing a milling tool 10 having twelve blades 32 of the present invention arranged at thirty degrees (30°) to each other, a depth of eighty-eight feet in three hours for a penetration rate of around thirty feet per hour was obtained at a rotational speed of milling tool 10 one hundred and seventy revolutions per minute (170 RPMs) and a weight applied of around twelve thousand pounds.

Referring now to the embodiment shown in FIGS. 7-13, a milling tool 10A is shown for cutting or milling away the upper end 12A of a casing 14A and has a cylindrical lower body portion 18A having a plurality of longitudinal slots 48 extending along the longitudinal axis L1. A plurality of improved blades 32A and 32B are mounted in slots 48 and secured, such as by welding, to body portion 18A. Each blade, 32A and 32B, has a leading planar face or surface 34A and a trailing planar face or surface 36A. Blades 32A, 32B are straight and of an elongate generally rectangular shape mounted on cylindrical body portion 18A.

Mounted on leading face 34A of each blade 32A, 32B are a plurality of cutting elements generally indicated at 42E. Cutting elements 42E are arranged in a plurality of horizontal rows R and R1 on the leading surface 34A of each blade 32A, 32B. Adjacent rows R and R1 of cutting elements 42E as shown particularly in FIG. 12 are staggered or offset with respect to each other with cutting element 42E in row R overlapping horizontally the cutting elements 42E and adjacent row R1. Four cutting elements 42E are shown in each row R,R1. However, it is to be understood that at least two cutting elements 42E should be provided in each row, and as many as may be desirable for the thickness of casing to be cut may be provided.

Referring to FIG. 13, the lower end portion of adjacent blade 32B on FIG. 13 is shown and it is noted that row R on blade 32A of FIG. 12 is in the same horizontal plane as row R1 on blade 32B in order to stagger or offset horizontally the cutting elements 42E on blade 32A with respect to cutting elements 42E on adjacent blade 32B so that different cutting paths are taken by the cutting elements 42E on adjacent blades. FIG. 8 shows blades 32A arranged in alternate relation with blades 32B so that the cutting elements 42E in row R of blade 32A follow a concentric path which covers the void areas formed between cutting elements 42E in row R1 of blade 32B.

Each cutting element 42E shown in the embodiment of FIG. 7-13 is identical and is formed of a generally frusto-conical shape having a generally planar front face 42F, a generally planar rear face 42G, and a frusto-conical peripheral surface 42H extending between faces 42F and 42G. A relative sharp edge 42I is formed at the juncture of peripheral surface 42H and front surface 42F.

The generally planar front surface 42F includes an annular flat 42J adjacent edge 42I for reinforcement of edge 42I, and an annular groove 42K tapering inwardly from the flat 42J to define a radius at 42L adjacent a circular center portion 42M of front face 42F. A metal cutting or shaving shown at S in FIG. 11 is received in and rides along tapered groove 42K with the extending end of metal shaving S being directed forwardly and downwardly by radius 42L to facilitate breaking of the metal turning or shaving S from upper end 12A of casing 14A. Leading face 42F has a negative axial rake angle formed at angle Al as shown in FIG. 11 which is generally the same as angle A shown in the embodiment of FIGS. 1-6. The inclination of face 42F in combination with the annular groove 42K and radius 42L formed thereby, assists in the breaking of the metal shavings S at a relatively short length of 1-3 inches, for example, and since a substantial thickness of shavings S is provided, the curling or turning up of the ends of the shavings is restricted, thereby to minimize internesting of the metal shavings to facilitate the removal of the shavings from the well bore.

For precisely positioning each cutting element 42E on blades 32A, 32B, leading surface 34A has a dimple or recess 50 formed therein to receive a respective cutting element 42E. Recess 50 is of a relatively shallow depth for example, and defines a surface area 52 slightly larger than the surface area of rear face 42G of cutting element 42E for receiving cutting element 42E. Recesses 50 are angled vertically at angle Al to provide the desired negative axial rake on cutting element 42E as faces 42F and 42G are in parallel planes, and are arranged in a predetermined pattern on leading surface 34A for receiving cutting elements 42E. Cutting elements 42E are secured, such as by brazing, to surface 34A after elements 42E are positioned within recesses 50. The precise positioning of cutting elements 42E on surface 34A results in cutting elements 42E projecting a uniform distance from surface 34A with leading faces 42F being in parallel relation Such a positioning results in a uniform and substantially equal loading of cutting elements 42E during the cutting operation.

In view of the relatively large number of cutting elements 42E on each blade 32A, 32B, it is desirable to preassembly cutting elements 42E into the desired pattern prior to positioning of the cutting elements 42A within recesses 50. For this purpose and referring to FIGS. 14 and 15, a template indicated generally at 54 is provided having openings or recesses 55 arranged in the predetermined pattern. Template 54 may be formed of a heat consumable material in the desired pattern and cutting elements 42E are positioned within openings 55 as shown in FIGS. 14 and 15. Template 54 with cutting elements 42E thereon is positioned in face to face relation with blade 32A and the cutting elements 42E are then pressed within the associated recesses. Then, a nickel-silver brazing material on blade 32A is heated along with blade 32A to a temperature around 1800° F. with the brazing material filling the void areas between individual cutting elements 42E and bonding cutting element 42E to leading surface 34A with cutting element 42E precisely positioned in recesses 50. As an alternative, template 54 could be formed of the brazing material with openings therein receiving the cutting elements Then the brazing material could be placed in face to face contact with blade 32A along with the cutting elements for brazing.

If desired, cutting elements 42E may be individually positioned within recesses 50 and brazed to leading surface 34A on blades 32A, 32B. The utilization of recesses 50 as positioning marks for the blades results in the cutting elements 42E being precisely positioned on the blades.

Referring to FIGS. 16 and 17, modified recesses 50P are illustrated for precisely positioning cutting elements 42P. The bottom surface formed by recess 50P in a vertical direction as shown in FIG. 16 is parallel to leading surface 34P and trailing surface 36P of blade 32P The rear face 42R of cutting element 42P fits against and is parallel to the bottom surface defined by recess 50P. Front face 42S of cutting element 42P is provided with the desired negative axial rake. Referring to FIG. 17, it is noted that recess 50P defines its bottom surface as being angled rearwardly in a horizontal direction with respect to the direction of rotation to provide a negative radial rake. If desired, recess 50P could be angled horizontally forwardly with respect to the direction of rotation to provide a positive radial rake as might be desirable for the removal of softer material, such as aluminum or plastic tubular members. The use of a negative radial rake would tend to direct the metal cuttings outwardly of the casing being cut whereas a positive radial rake would tend to direct the metal cuttings inwardly of the casing.

Cutting elements for the blades may be formed of different sizes and shapes and yet result in an efficient and effective cutting operation if positioned in a predetermined pattern in generally side by side relation. Referring to FIGS. 18-20, examples of cutting elements of different shapes and sizes are illustrated which would function satisfactorily with the present invention.

FIG. 18 shows an embodiment of cutting elements 42S of a semi-circular shape positioned on leading face 34S of blade 32S. Sharp arcuate edges shown at 56 are continually presented to the upper annular end of the casing for the cutting of the casing. The semi-circular cutting elements 42S are in horizontally staggered or offset relation in adjacent rows as in the other embodiments of the invention.

FIG. 19 shows a combination of generally cylindrical discs 42X and triangular elements 42Y positioned on leading face 34X of blade 32X and having adjacent horizontally staggered rows.

FIG. 20 shows another embodiment of cutting elements in which chevron or V-shaped cutting elements 42Z are positioned in two vertical rows on the leading surface 34Z of blade 32Z. Lower V-shaped cutting edges 60 are formed on each of the cutting elements 42Z and are continually presented to the upper end of the casing for cutting away the casing.

Figure 21:
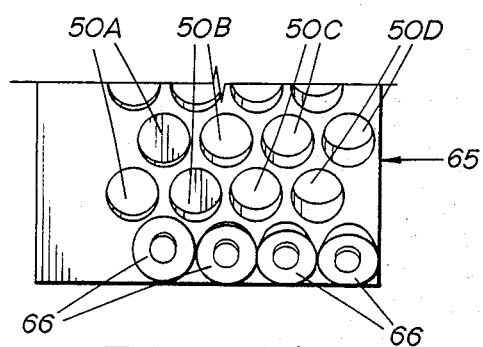
FIG. 21 is a plan of a lower end portion of a straight blade illustrating modified recesses for receiving the cutting elements.
Figure 22:
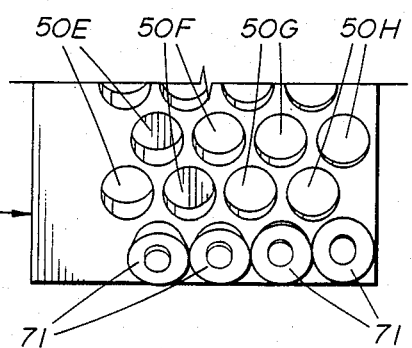
FIG. 22 is a view similar to FIG. 21 but shows further modified recesses for receiving the cutting elements.

Referring to FIGS. 21 and 22, modified recesses are shown for positioning cutting elements and providing a radial rake for the cutting elements. FIG. 21 shows a straight blade 65 having a lower row of cutting elements thereon with the cutting elements being removed from recesses 50A, 50B, 50C and 50D in an adjacent row. Recesses 50A, 50B, 50C and 50D each has a different depth varying from a minimum depth for recesses 50A to a maximum depth for recess 50D adjacent the outer edge of blade 65. The bottom surfaces formed by recesses 50A-50D are inclined rearwardly with respect to the direction of rotation and are in a common vertical plane to provide a negative radial rake to cutting elements 66 of the same shape and size.

FIG. 22 is similar to FIG. 21 and shows a straight blade 70 having a plurality of cutting elements 71 of the same shape and size. Recesses 50E, 50F, 50G, and 50H are shown with cutting elements 71 removed with each recess having a different depth varying from a maximum depth for recess 50E and a minimum depth for recess 50H adjacent the outer edge of blade 70. The bottom surfaces formed by recesses 50E-50H are inclined forwardly with respect to the direction of rotation and are in a common vertical plane to provide a positive radial rake to cutting elements 71 which may be desirable under certain conditions, such as a requirement for directing the cuttings or metal turnings inwardly of the casing being cut away.

Figure 23:
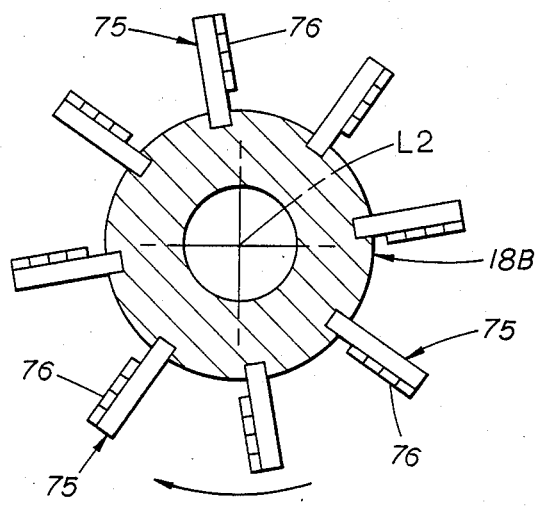
FIG. 23 is a partial cross-section of a tool body showing a modified blade arrangement to provide a negative radial rake for the cutting elements.
Figure 24:
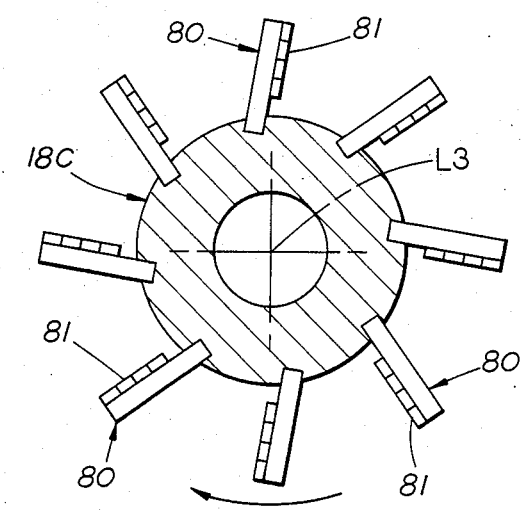
FIG. 24 is a partial cross-section similar to FIG. 23 but showing an additional modified blade arrangement to provide a positive radial rake for the cutting elements.

Referring to FIGS. 23 and 24, additional modifications are illustrated for providing a radial rake to the cutting elements. FIG. 23 shows straight blades 75 mounted on the outer periphery of tool body 18B along the longitudinal axis of rotation L2 but angled radially rearwardly on body 18B with respect to the axis of rotation to provide a negative radial rake for cutting elements 76 mounted on the leading face of blades 75.

FIGS. 24 is similar to FIG. 23 but shows straight blades 80 mounted on tool body 18C along the longitudinal axis of rotation L3 but angled radially forwardly from body 18C to provide a positive radial rake for cutting elements 81 mounted on the leading face of blades 80.

Figure 25:
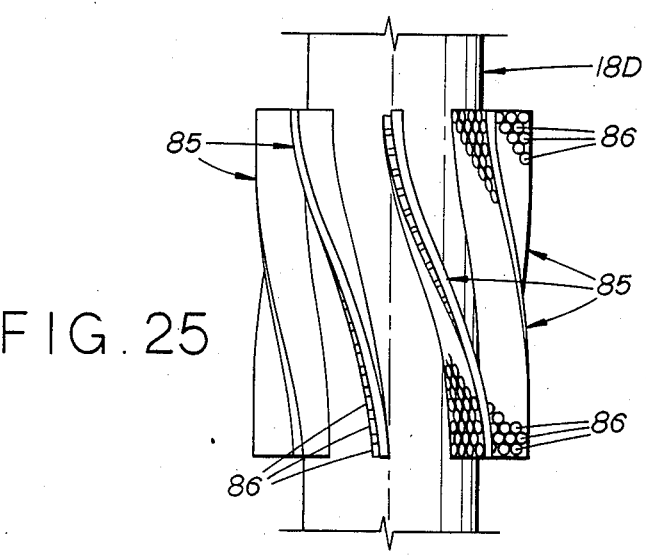
FIG. 25 is a partial side elevation of a tool body showing spiral blades mounted on the outer periphery of the tool body.

FIG. 25 shows an additional modification in which a plurality of spiral blades 85 are mounted on the outer periphery of tool body 18D in a spiral pattern. Cutting elements 86 which are similar to cutting elements 42E shown in the embodiment of FIGS. 7-13, are mounted on the leading face of spiral blades 85 and have a depression formed in their leading cutting face acting as a chip breaker to provide an efficient cutting action. Spiral blades 85 may be provided with a positive radial rake or with a negative radial rake, if desired, such as illustrated in the embodiments of FIGS. 23 and 24.

From the above, it is apparent that the cutting or milling tool comprising the present invention and utilizing an improved blade design has been provided which increases the rate of penetration or rate of removal of an object or member cut away within an existing well to an amount that is three or four times greater than heretofore. By providing a cutting tool with such an improved blade design which results in an effective and fast removal rate of the metal scrap material from the well under the operational characteristics se forth, a highly improved result has been obtained.

While the blades have been illustrated in the drawings as being fixed to the tool body, it is to be understood that the blades of this invention, if desired, may be mounted for pivotal movement in a radial direction on the tool body, or may be mounted on arms which are in turn mounted for pivotal movement in a radial direction on the tool body. Also, blades of this invention may be provided in the lower surface or bottom of a tool body, such as for rotary shoes or the like.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A method of securing a plurality of cutting elements at precise positions on a generally planar surface of a blade adapted to be mounted on a cutting tool for cutting previously existing casing in a well bore and comprising the following steps:

making the planar surface of the blade with a separate mark for each separate cutting element;

preassembling in a template all of the cutting elements for the blade in a predetermined pattern identified by the marks on the blades;

placing the preassembled cutting elements on the blade with each cutting element positioned precisely thereon with respect to its respective mark; and then brazing the cutting elements onto the surface of the blade for securing the cutting elements thereon in precise relation to each other.

2. A method of securing a plurality of cutting elements at precise positions on a generally planar surface of a blade adapted to be mounted on a cutting tool for removing material from the well bore and comprising the following steps:

forming a plurality of recesses on the planar surface of the blade in a predetermined pattern with a recess for each cutting element;

preassembling in a template all of the cutting elements for the blade in the predetermined pattern established by the recesses in said blade;

placing the preassembled cutting elements on the blade in alignment with the recesses receiving the cutting elements therein; and brazing the cutting elements onto the surface of the blade for securing the cutting elements in the recesses in the predetermined pattern.

3. The method as set forth in claim 2 further including the step of forming the template from the material utilized for brazing the cutting elements on the blade.

* * * * *

UNITED STATES PATENT AND TRADEMARK OFFICE
CERTIFICATE OF CORRECTION

PATENT NO. : 4,984,488

DATED : January 15, 1991

INVENTOR(S) : Gerald D. Lynde; Harold H. Harvey

It is certified that error appears in the above-identified patent and that said Letters Patent is hereby corrected as shown below:

On the title page item [19] "Lunde" should read --Lynde--; and item [75] "Lunde" should read --Lynde--.

Signed and Sealed this

Fourteenth Day of July, 1992

Attest:

DOUGLAS B. COMER

*Attesting Officer*     Acting Commissioner of Patents and Trademarks